United States Patent
Roh

(10) Patent No.: US 9,054,614 B2
(45) Date of Patent: Jun. 9, 2015

(54) APPARATUS AND METHOD TO CONTROL BLDC MOTOR

(71) Applicant: SAMSUNG ELECTRONICS CO., LTD., Suwon-si, Gyeonggi-do (KR)

(72) Inventor: Chang Hyun Roh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 211 days.

(21) Appl. No.: 13/732,779

(22) Filed: Jan. 2, 2013

(65) Prior Publication Data
US 2013/0175956 A1    Jul. 11, 2013

(30) Foreign Application Priority Data

Jan. 6, 2012 (KR) .................. 10-2012-0002189

(51) Int. Cl.
*H02M 3/04* (2006.01)
*H02M 3/157* (2006.01)
*H02P 6/16* (2006.01)
*H02P 6/14* (2006.01)

(52) U.S. Cl.
CPC . *H02P 6/16* (2013.01); *H02P 6/142* (2013.01)

(58) Field of Classification Search
CPC ..................................................... H02M 3/157
USPC ............... 318/400.04, 599, 400.01, 700, 603, 318/601, 602, 667; 361/236–244; 324/160–180; 323/282, 283; 327/149, 327/158, 237
See application file for complete search history.

(56) References Cited

U.S. PATENT DOCUMENTS

| | | | | |
|---|---|---|---|---|
| 4,123,692 | A * | 10/1978 | Gilmore et al. .................. | 363/41 |
| 5,400,089 | A * | 3/1995 | Danloup et al. .................. | 351/92 |
| 5,400,237 | A * | 3/1995 | Flanagan et al. ................. | 363/41 |
| 6,700,343 | B2 * | 3/2004 | Masaki et al. ................. | 318/434 |
| 6,844,697 | B2 * | 1/2005 | Masaki et al. ................. | 318/721 |
| 8,089,232 | B2 * | 1/2012 | Itagaki et al. ............ | 318/400.11 |

FOREIGN PATENT DOCUMENTS

| KR | 10-2003-0045194 | 7/2003 |
|---|---|---|
| KR | 10-2003-0077364 | 11/2003 |

* cited by examiner

*Primary Examiner* — Rita Leykin
(74) *Attorney, Agent, or Firm* — Harness, Dickey & Pierce, P.L.C.

(57) ABSTRACT

An apparatus and method to control a brushless direct current (BLDC) motor, which accurately detect driving current. To this end, the BLDC motor control apparatus includes a BLDC motor, a driver to generate driving current to drive the BLDC motor, a current measurer to measure the driving current, a pulse width modulator to change a driving voltage to drive the BLDC motor; and a controller to control the BLDC motor. The controller detects the amount of the driving current in synchronization with pulse width modulation of the pulse width modulator and determines current with a minimum change due to a variation of counter electromotive force, among currents flowing through a plurality of coils, as the driving current, thereby accurately detecting the driving current.

15 Claims, 9 Drawing Sheets

FIG. 7

| SEQUENCE | OUTPUT OF HALL SENSOR | TURNED-ON SWITCH | | DIRECTION OF CURRENT INPUT TO INPUT TERMINAL OF MOTOR | | |
|---|---|---|---|---|---|---|
| | | | | COIL 641 | COIL 642 | COIL 643 |
| 1 | 001 | SWITCH 601 | SWITCH 613 | (+) | 0 | (−) |
| 2 | 000 | SWITCH 601 | SWITCH 612 | (+) | (−) | 0 |
| 3 | 100 | SWITCH 603 | SWITCH 612 | 0 | (−) | (+) |
| 4 | 110 | SWITCH 603 | SWITCH 611 | (−) | 0 | (+) |
| 5 | 111 | SWITCH 602 | SWITCH 611 | (−) | (+) | 0 |
| 6 | 011 | SWITCH 602 | SWITCH 613 | 0 | (+) | (−) |

FIG. 9

| SEQUENCE | OUTPUT OF HALL SENSOR | COIL IN WHICH CURRENT WITH MINIMUM CHANGE FLOWS | OUTPUT DETECTED BY CONTROLLER |
|---|---|---|---|
| 1 | 001 | COIL 643 | AMPLIFIER 633 |
| 2 | 000 | COIL 641 | AMPLIFIER 631 |
| 3 | 100 | COIL 642 | AMPLIFIER 632 |
| 4 | 110 | COIL 643 | AMPLIFIER 633 |
| 5 | 111 | COIL 641 | AMPLIFIER 631 |
| 6 | 011 | COIL 642 | AMPLIFIER 632 |

APPARATUS AND METHOD TO CONTROL BLDC MOTOR

CROSS-REFERENCE TO RELATED APPLICATIONS

This application claims the benefit of Korean Patent Application No. 10-2012-0002189, filed on Jan. 6, 2012 in the Korean Intellectual Property Office, the disclosure of which is incorporated herein by reference.

BACKGROUND

1. Field

Embodiments of the present disclosure relate to an apparatus and method to control a brushless direct current (BLDC) motor, which may detect driving current flowing through coils of the BLDC motor and may prevent errors from occurring during detection of the driving current.

2. Description of the Related Art

Unlike a direct current (DC) motor in which a permanent magnet is installed on a stator and a coil is installed on a rotor and which changes current flowing through the coil via a commutator and a brush, a brushless direct current (BLDC) motor, which is configured in such a way that a permanent magnet is installed on a rotor and a coil is installed on a stator and no commutator and brush are required, rotates the rotor including the permanent magnet installed thereon through a continuous rotating field that is formed by changing driving current. In general, a pulse width modulator is used for the BLDC motor in order to change a driving voltage in response to a change in the driving current.

The pulse width modulator that is used to change the driving voltage in the BLDC motor repeats an on/off switching operation in which switching noise may occur. The switching noise is transferred to a BLDC motor driver and the BLDC motor. Thus, the switching noise is contained in the driving current, which is used to drive the BLDC motor.

In general, a control apparatus for the BLDC motor uses a current control loop to measure current input to the BLDC motor and to feedback the current to the controller in order to control a torque of the BLDC motor. The pulse width modulator to drive the BLDC motor and the current control loop operate independently from each other. In this regard, when the current control loop measures the driving current at a time that the driving voltage is changed by the pulse width modulator, switching noise occurs in the measured driving current, and then, the driving current containing the switching noise is detected.

For this reason, such a conventional BLDC motor control apparatus inaccurately detects current, resulting in a difficulty in accurate current control and degradation in control performance.

SUMMARY

Therefore, it is an aspect of the present disclosure to provide an apparatus and method to control a brushless direct current (BLDC) motor, by which driving current is detected at a time when minimum switching noise occurs.

Additional aspects of the disclosure will be set forth in part in the description which follows and, in part, will be apparent from the description, or may be learned by practice of the disclosure.

In accordance with one aspect of the present disclosure, a brushless direct current (BLDC) motor control apparatus includes a BLDC motor including a hole sensor, a current measurer to measure driving current to drive the BLDC motor, a driver including an inverter to drive the BLDC motor, a pulse width modulator to change a driving voltage to drive the BLDC motor, and a controller to control the BLDC motor based on the amounts of currents measured by the current measurer.

The BLDC motor may be a 3-phase BLDC motor including a stator including three coils, a rotor disposed rotatably with respect to the stator, and a hall sensor for commutation of the BLDC motor. In addition, the BLDC motor may transmit an output of the hall sensor to the controller.

The driver may receive the driving voltage output from the pulse width modulator and may generate the driving current.

The current measurer may include a resistor connected in series between the driver and a coil of the BLDC motor, and a bidirectional differential amplifier including input terminals connected to both ends of the resistor, may measure the amount and direction of currents flowing through coils of the BLDC motor, and may transmit the amount and direction of the currents to the controller.

The pulse width modulator may include a register to store a predefined first value and a predefined second value, a counter (hereinafter, referred to as a up/down counter) to perform up or down counting, a comparer to compare the predefined first value and the predefined second value with an output of the counter, and an output circuit to output the driving voltage.

The first value indicating a count corresponding to one pulse width modulation period and the second value indicating a difference between the first value and a count corresponding to a pulse width of the driving voltage may be stored in the register.

The up/down counter may perform the up counting until the output of the up/down counter reaches half the first value. When the output of the up/down counter reaches half the first value, the up/down counter may perform the down counting. In addition, during the up counting, when the output of the up/down counter reaches half the second value, the output circuit may output the driving voltage. During the down counting, when the output of the up/down counter reaches half the second value, the output circuit may stop the output of the driving voltage.

The pulse width modulator may generate the driving voltage by using the above-described method and may transmit a time when the output of the up/down counter reaches half the first value, to the controller.

The controller may detect current flowing through a coil of the BLDC motor, which is measured by the current measurer, at a time when the output of the up/down counter reaches half the first value output from the pulse width modulator.

The controller may determine a current flowing through a certain coil among coils of the BLDC motor as the driving current, based on the output of the hole sensor, the current flowing through the certain coil having the same phase as a previous phase.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a table showing a relationship between an output of a hall sensor of a 3-phase BLDC motor and currents flowing through coils of a BLDC motor, according to an embodiment of the present disclosure;

FIG. 9 is a table showing an output of a hole sensor, a coil through which current with a minimum change flows, and an output of the current measurer, which is correspondingly detected by a controller, according to an embodiment of the present disclosure.

DETAILED DESCRIPTION

Figure 1:
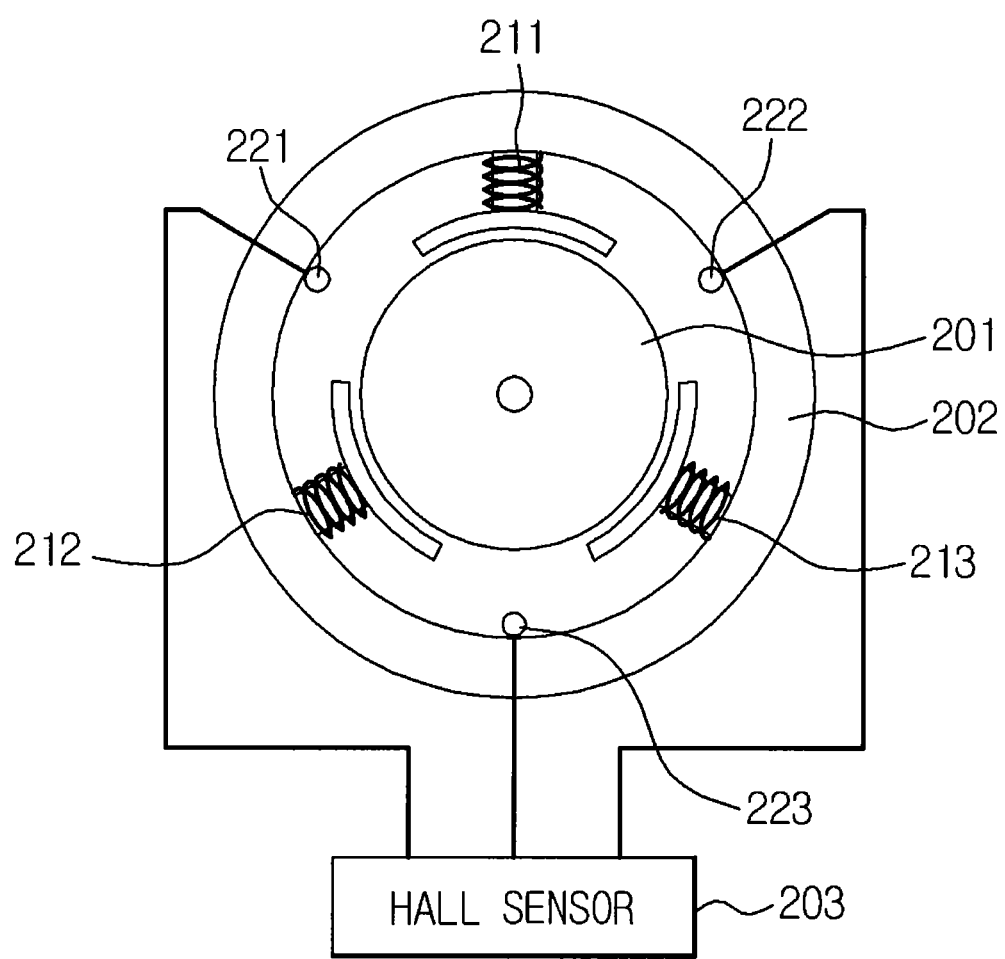
FIG. 1 is a schematic diagram of a 3-phase brushless direct current (BLDC) motor according to an embodiment of the present disclosure.

Reference will now be made in detail to the embodiments of the present disclosure, examples of which are illustrated in the accompanying drawings, wherein like reference numerals refer to like elements throughout.

Figure 2:
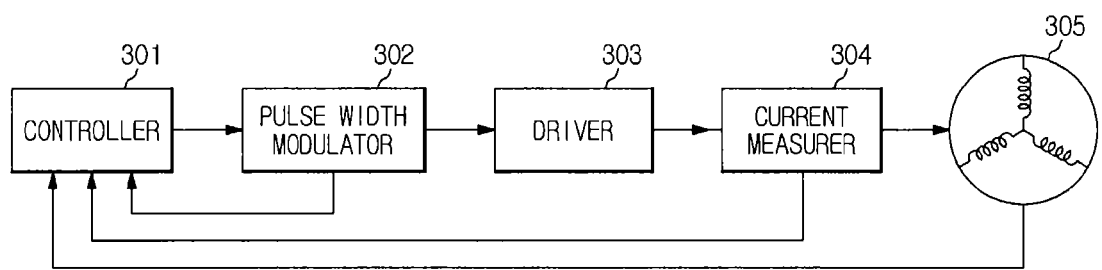
FIG. 2 is a schematic block diagram of a BLDC motor control apparatus according to an embodiment of the present disclosure.

FIG. 1 is a schematic diagram of a 3-phase brushless direct current (BLDC) motor according to an embodiment of the present disclosure, and FIG. 2 is a block diagram of a BLDC motor control apparatus according to an embodiment of the present disclosure.

Referring to FIG. 1, the BLOC motor is a 3-phase BLDC motor including a stator 202 on which three coils 211 to 213 are installed, a rotor 201 on which a permanent magnet is installed, and a hall sensor 203. The hall sensor 203 includes three magnetic field detectors 221 to 223.

Referring to FIG. 2, the BLDC motor control apparatus includes a 3-phase BLDC motor 305, a current measurer 304 to measure currents flowing through coils of the BLDC motor 305, a driver 303 including an inverter to drive the BLDC motor 305, a pulse width modulator 302 to change a driving voltage to drive the BLDC motor 305, and a controller 301 to control the BLDC motor 305 using the amounts of the currents measured by the current measurer 304.

The controller 301 detects driving current supplied to the BLDC motor 305 based on an output of the hall sensor 203 included in the BLDC motor 305 and the amounts of the currents measured by the current measurer 304 to output a control signal to control the BLDC motor 305.

The pulse width modulator 302 generates the driving voltage in response to the control signal output by the controller 301 and transmits a time to detect the amounts of the currents measured by the current measurer 304 to the controller 301. Here, the driving voltage is of pulse type.

The driver 303 supplies the driving current based on the driving voltage generated by the pulse width modulator 302.

The current measurer 304 measures the amount of the driving current that is generated by the driver 303 and is supplied to the BLDC motor 305 and transmits the amount of the driving current to the controller 301.

Figure 3:
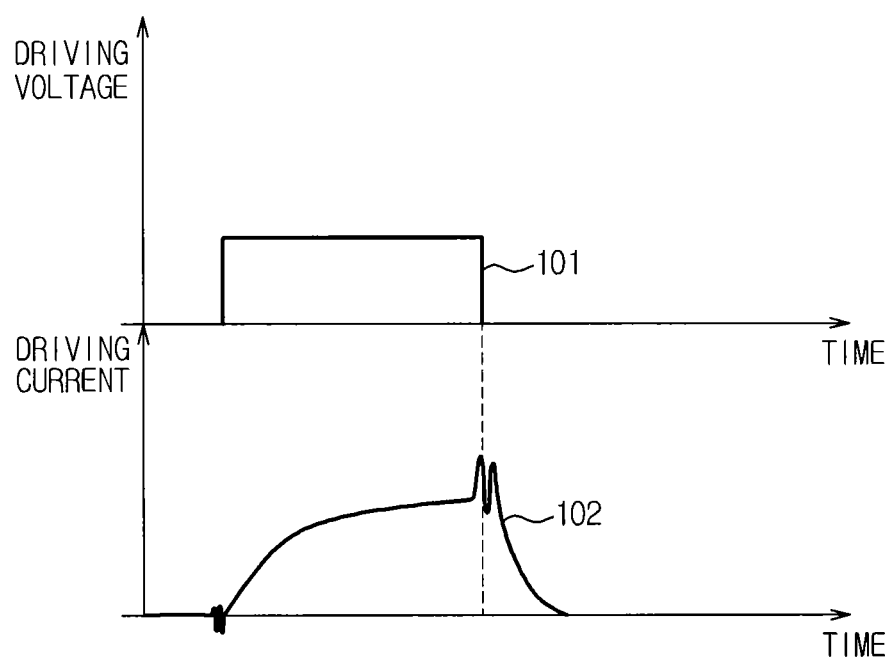
FIG. 3 is a waveform diagram of a driving voltage modulated by a pulse width modulator and driving current of a BLDC motor, which corresponds to the driving voltage.

FIG. 3 is a waveform diagram of a driving voltage 101 modulated by the pulse width modulator 302 and driving current 102 of the BLDC motor 305, which corresponds to the driving voltage 101.

As may be seen from FIG. 3, even if the driving voltage 101 abruptly increases, the driving current 102 increases logarithmically due to inductance of the BLDC motor 305 and switching noise is contained in the driving current 102 of the BLDC motor 305 due to a switching operation of the pulse width modulator 302.

Figure 4:
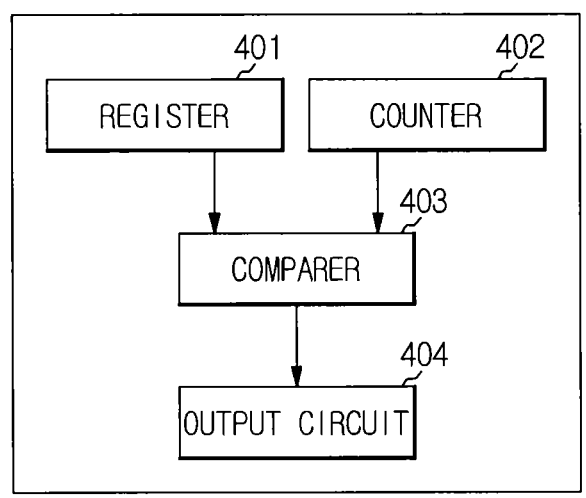
FIG. 4 is a schematic block diagram of a pulse width modulator according to an embodiment of the present disclosure.

FIG. 4 is a schematic block diagram of a pulse width modulator according to an embodiment of the present disclosure.

Referring to FIG. 4, the pulse width modulator 302 includes a register 401 to store a predefined first value and a predefined second value, a counter 402 to perform up and down counting, a comparer 403 to compare an output of the counter 402 with the first value and the second value, and an output circuit 404 to output the driving voltage.

The register 401 stores the first value indicating a count corresponding to one pulse width modulation period and the second value indicating a difference between the first value and a count corresponding to a pulse width of the driving voltage.

During the up counting of the counter 402, when the output of the counter 402 reaches half the first value, the counter 402 performs the down counting.

During the up counting of the counter 402, when the output of the counter 402 reaches half the second value, the output circuit 404 outputs the driving voltage. During the down counting of the counter 402, when the output of the counter 402 reaches half the second value, the output circuit 404 stops the output of the driving voltage.

For example, when counts from about 0 to about 100 are defined as one period (that is, the first value is defined as 100) and a count corresponding to the pulse width of the driving voltage in the counts is 70 (that is, the second value is defined as 30.), the counter 402 performs the up counting from 0 to 50 and then performs the down counting from 50 to 0.

During the up counting of the counter 402, when a count reaches 15, the output circuit 404 outputs the driving voltage. During the down counting of the counter 402, when a count reaches 15, the output circuit 404 stops the output of the driving voltage. Accordingly, the output circuit 404 outputs a driving voltage pulse during a total count 70.

Figure 5:
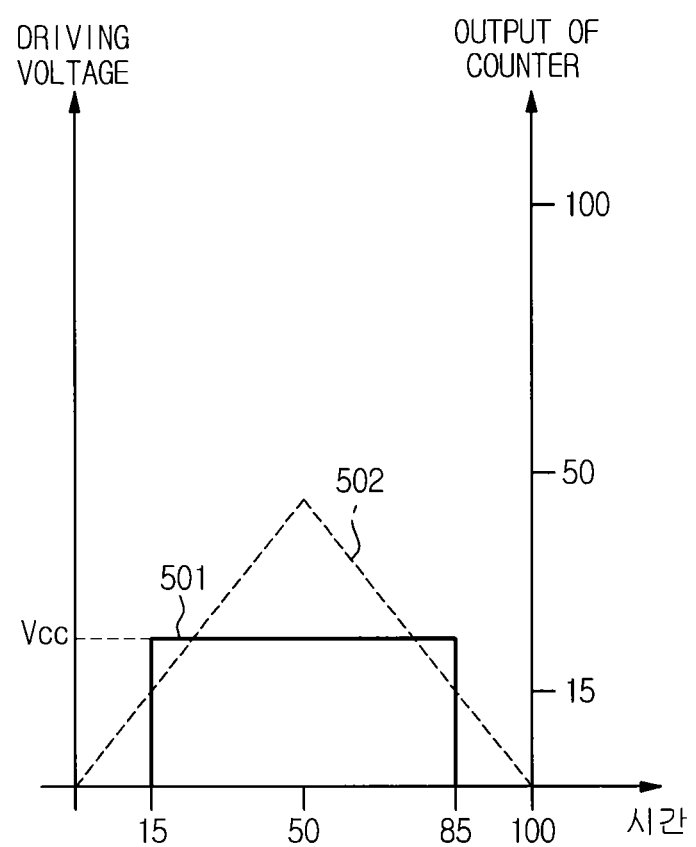
FIG. 5 is a waveform diagram of a driving voltage of a pulse width modulator according to an embodiment of the present disclosure.

FIG. 5 is a waveform diagram of an output 502 of the counter 402 of the pulse width modulator 302 and a waveform 501 of the driving voltage that is correspondingly output by the output circuit 404, according to an embodiment of the present disclosure.

As may be seen from FIG. 5, the output 502 of the counter 402 increases up to 50 and decreases thereafter and the output circuit 404 outputs the driving voltage only when the output 502 of the counter 402 is equal to or greater than 15.

According to the present embodiment, a 3-phase BLDC motor has 6 phases. In this case, when commutation occurs six times, a rotor of the BLDC motor rotates once. Thus, the first value may be a count corresponding to 60 degrees of rotation of the rotor of the BLDC motor and the second value may be obtained by subtracting the count corresponding to the pulse width of the driving voltage from the first value.

As may be seen from FIGS. 3 and 5, pulse width modulation does not occur at a time corresponding to half the first value. Thus, when the output of the counter 402 of the pulse width modulator 302 reaches half the first value, if the controller 301 detects the driving current, the detected driving current may contain minimum switching noise. Accordingly, according to an embodiment of the present disclosure, in order for the controller 301 to detect the driving current at a time when switching noise is minimized, a time when the output of the counter 402 corresponds to half the first value is transmitted to the controller 301.

Figure 6:
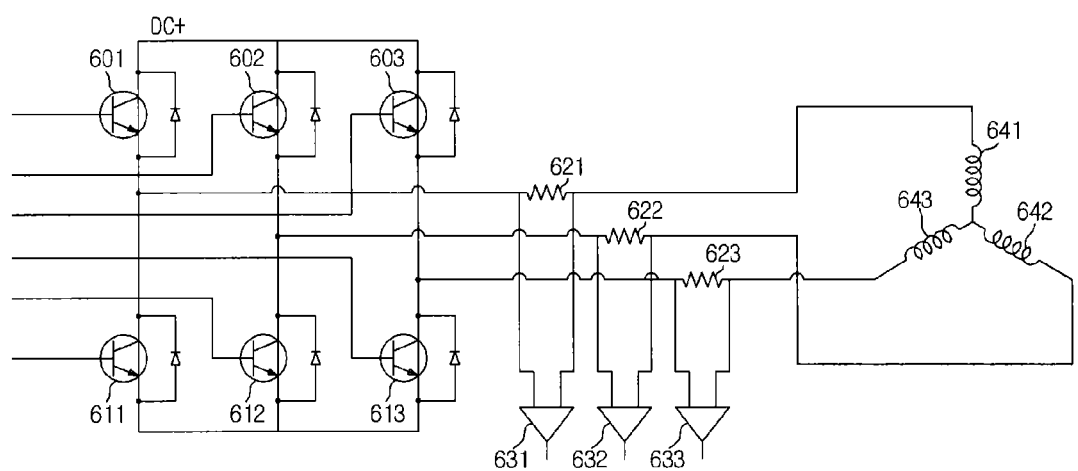
FIG. 6 is a circuit diagram of a driver, a current measurer, and a BLDC motor according to an embodiment of the present disclosure.

FIG. 6 is a circuit diagram of a driver, a current measurer, and a 3-phase BLDC motor according to an embodiment of the present disclosure.

Referring to FIG. 6, the driver 303 includes three inverters including six switches 601 to 603 and 611 to 613 to drive the 3-phase BLDC motor 305.

The current measurer 304 includes resistors 621 to 623 each connected in series between a corresponding one of output terminals of the inverters of the driver 303 and a corresponding one of input terminals of the BLDC motor 305, and a plurality of bidirectional differential amplifiers 631 to 633 each having input terminals connected to both ends of a corresponding one of the resistors 621 to 623.

The current measurer 304 measures the direction and amount of current by using the bidirectional differential amplifiers 631 to 633 each having input terminals connected to the both ends of the corresponding one of the resistors 621 to 623 and transmits the direction and amount of the current to the controller 301. According to the present embodiment, the current measurer 304 measures the currents corresponding to the number of the coils of the 3-phase BLDC motor 305, and thus three currents are measured.

In general, the BLDC motor 305 includes the hall sensor 203 to detect a rotating field. The controller 301 for the BLDC motor 305 detects a position of the rotor 201 based on the output of the hall sensor 203 and changes the driving current by using the pulse width modulator 302 according to the position of the rotor 201, which is detected based on the output of the hall sensor 203, so as to rotate the rotor 201. Such a series of processes is referred to as commutation.

FIG. 7 is a table showing a relationship between an output of the hall sensor 203 of the BLDC motor 305 and currents flowing through coils of the BLDC motor 305. The output of the hall sensor 203 varies according to a standard of a manufacturer thereof or a designer's definition. However, according to an embodiment of the present disclosure, the output of the hall sensor 203 is defined as shown in FIG. 7.

Referring to FIG. 7, according to the present embodiment, with regard to sequence 1, the output of the hall sensor 203 is "001", a switch 601 and a switch 613 are turned on by the pulse width modulator 302, and current flows through a coil 641 and a coil 643. Thus, when a direction in which current is input to the BLDC motor 305 is defined as a positive (+) direction, positive (+) current flows through the coil 641, current does not flow through a coil 642, and negative (−) current flows through the coil 643.

With regard to sequence 2, the output of the hall sensor 203 is "000", the switch 601 and a switch 612 are turned on by the pulse width modulator 302, and current flows through the coil 641 and the coil 642. Thus, positive (+) current flows through the coil 641, negative (−) current flows through the coil 642, and current does not flow through the coil 643.

Figure 8:
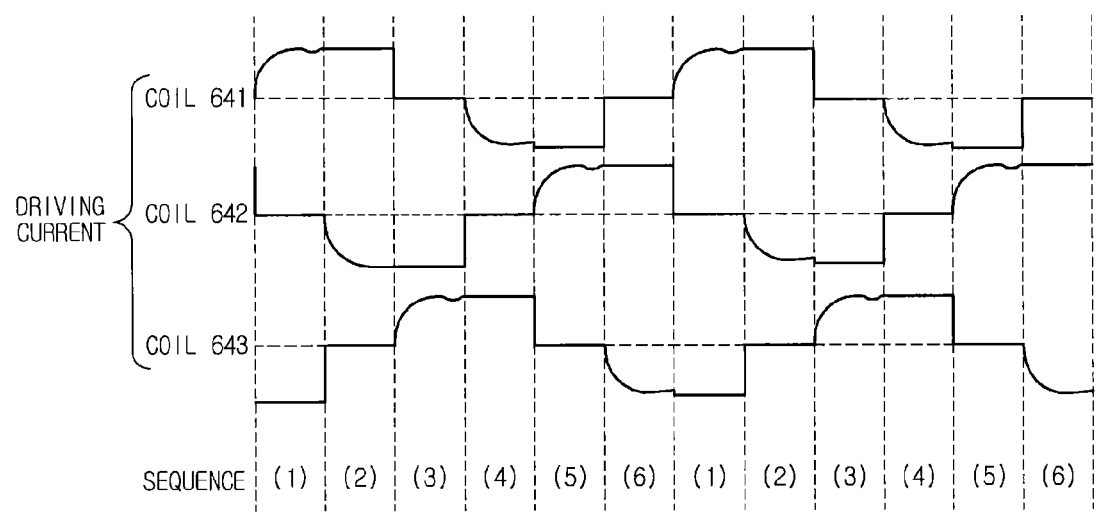
FIG. 8 is a waveform diagram of currents flowing through coils of a 3-phase BLDC motor, according to an embodiment of the present disclosure.

FIG. 8 is a waveform diagram of currents flowing through coils of the BLDC motor 305 of FIG. 7, according to an embodiment of the present disclosure.

As may be seen from FIG. 8, current flowing through a certain coil has the same phase as a previous phase, and here, a change in the current due to a variation of counter electromotive force is minimized. According to the present embodiment, with regard to sequence 2, the current having the same phase as a previous phase flows through the coil 641, and the output of the hall sensor 203 is "000". Thus, when the output of the hall sensor 203 is "000", the current flowing through the coil 641 is the driving current with the minimum change due to the variation of the counter electromotive force.

Through the above-described method, with regard to sequence 3, when the output of the hall sensor 203 is "100", current with the minimum change flows through the coil 642. In addition, with regard to sequence 4, when the output of the hall sensor 203 is "110", the current flowing through the coil 643 is the driving current with the minimum change.

Thus, when the output of the hall sensor 203 is "001", the controller 301 determines an output of the bidirectional differential amplifier 633 to measure current flowing through the resistor 623 and the coil 643 as the driving current supplied to the BLDC motor 305. When the output of the hall sensor 203 is "000", the controller 301 determines an output of the bidirectional differential amplifier 631 to measure current flowing through the resistor 621 and the coil 641 as the driving current. When the output of the hall sensor 203 is "100", the controller 301 determines an output of the bidirectional differential amplifier 632 to measure current flowing through the resistor 622 and the coil 642 as the driving current.

FIG. 9 is a table showing outputs of the hall sensor 203, coils through which driving current with a minimum change due to a variation of counter electromotive force flows, and outputs of the current measurer 304, which is correspondingly detected by the controller 301, according to an embodiment of the present disclosure.

According to the above-described method, the driving current may be detected by selecting current, which flows through a certain coil with the minimum change among a plurality of coils, as the driving current, thereby accurately detecting the driving current.

As is apparent from the above description, a controller may detect the driving current of the BLDC motor at a time when pulse width modulation does not occur by a pulse width modulator, and thus, may detect the driving current at a time when switching noise due to the pulse width modulator is minimized.

In addition, the controller may determine current having the same phase a previous phase during commutation of the BLDC motor, among currents flowing through a plurality of coils, as the driving current, and thus, may detect the current with the minimum change due to the variation of the counter electromotive force, which is generated by inductance of the BLDC motor.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A motor control apparatus comprising:
   a pulse width modulator to generate a pulse of a driving voltage to drive a brushless direct current (BLDC) motor;
   a driver to generate driving current to drive the BLDC motor, based on the pulse;
   a current measurer to measure the amount of the driving current; and
   a controller to detect the amount of the driving current measured by the current measurer in synchronization with the pulse width modulator,
   wherein the controller determines the driving current supplying to a certain coil among coils of the BLDC motor after commutation of the BLDC motor, the certain coil is supplied with the driving current before and after the commutation.

2. The motor control apparatus according to claim 1, wherein the controller determines current flowing through a certain coil among coils of the BLDC motor as the driving current, the current flowing through the certain coil having the same phase as a previous phase during commutation of the BLDC motor.

3. The motor control apparatus according to claim 2, wherein the BLDC motor is a 3-phase BLDC motor comprises:
a stator comprising three coils;
a rotor disposed rotatably with respect to the stator; and
a hall sensor for the commutation of the BLDC motor.

4. The motor control apparatus according to claim 2, wherein the pulse width modulator comprises:
a counter to perform up or down counting;
a register to store a first value indicating a count corresponding to one pulse width modulation period and a second value indicating a difference between the first value and a count corresponding to a pulse width of the driving voltage;
a comparer to compare the first value and second value stored in the register with an output of the counter; and
an output circuit to generate the pulse of the driving voltage, based on an output of the comparer.

5. The motor control apparatus according to claim 4, wherein the counter performs the down counting, when the output thereof reaches half the first value stored in the register during the up counting, and
wherein the output circuit outputs the driving voltage when the output of the counter reaches half the second value stored in the register during the up counting, and stops the output of the driving voltage when the output of the counter reaches half the second value during the down counting.

6. The motor control apparatus according to claim 5, wherein the controller detects the driving current measured by the current measurer at a time when the output of the counter reaches half the first value stored in the register.

7. The motor control apparatus according to claim 2, wherein the current measurer comprises:
a resistor connected in series between an output terminal of the driver and an input terminal of the BLDC motor; and
a bidirectional differential amplifier having input terminals connected to both ends of the resistor.

8. A method to control a brushless direct current (BLDC) motor in a pulse width modulation manner, the method comprising:
storing a first value and a second value in a register of a pulse width modulator to modulate a pulse width of a driving voltage to drive the BLDC motor, the first value indicating a count corresponding to one pulse width modulation period and the second value indicating a difference between the first value and a count corresponding to a pulse width of the driving voltage;
an output circuit of the pulse width modulator outputting the driving voltage when an output of a counter of the pulse width modulator reaches half the second value during up counting of the counter; and
the counter performing down counting when the output of the counter reaches half the first value; and
stopping the output of the driving voltage when the output of the counter reaches half the second value during the down counting of the counter.

9. The method according to claim 8, further comprising a controller detecting driving current to drive the BLDC motor when the output of the counter reaches half the first value.

10. The method according to claim 9, further comprising the controller determining current flowing through a certain coil among coils of the BLDC motor as the driving current, the current flowing through the certain coil having the same phase as a previous phase during commutation of the BLDC motor.

11. A control method of a brushless direct current (BLDC) motor, comprising:
generating a pulse of a driving voltage to drive the BLDC motor;
generating a driving current to drive the BLDC motor, based on the pulse;
detecting an amount of the driving current in synchronization with the generating the pulse,
wherein the detecting of the amount of the driving current includes determining the driving current supplying to a certain coil among coils of the BLDC motor after commutation of the BLDC motor, the certain coil is supplied with the driving current before and after the commutation.

12. The control method according to claim 11, wherein the driving current is a current flowing through a certain coil among coils of the BLDC motor, and
the current flowing through the certain coil has the same phase as a previous phase during commutation of the BLDC motor.

13. The control method according to claim 12, wherein generating the pulse comprises:
performing up and down counting of a pulse width of the driving voltage;
storing a first value indicating a count corresponding to one pulse width modulation period and a second value indicating a difference between the first value and a count corresponding to a pulse width of the driving voltage;
comparing the stored first value and second value with the performed counting; and
generating the pulse of the driving voltage, based on the comparison.

14. The control method according to claim 13, wherein performing up and down counting comprises performing the up counting and subsequently performing the down counting when the up counting reaches half the stored first value, and
generating the pulse of the driving voltage comprises outputting the driving voltage when the up and down counting reaches half the stored second value during the up counting, and stopping the output of the driving voltage when the up and down counting reaches half the stored second value during the down counting.

15. The control method according to claim 14, wherein detecting the driving current is performed during the up and down counting when half the stored first value is reached during the up counting.

* * * * *